(12) United States Patent
Kaiser

(10) Patent No.: US 7,728,836 B2
(45) Date of Patent: Jun. 1, 2010

(54) SYSTEMS AND METHODS FOR DISPLAYING TIME DEPENDENT INFORMATION

(75) Inventor: Martin Kaiser, Speyer (DE)

(73) Assignee: SAP AG, Walldorf (DE)

( * ) Notice: Subject to any disclaimer, the term of this patent is extended or adjusted under 35 U.S.C. 154(b) by 546 days.

(21) Appl. No.: 11/418,911

(22) Filed: May 5, 2006

(65) Prior Publication Data
US 2007/0271161 A1    Nov. 22, 2007

(51) Int. Cl.
*G06T 11/20* (2006.01)
(52) U.S. Cl. .................. 345/440; 345/428; 715/200
(58) Field of Classification Search .............. 345/440, 345/428; 715/963; 725/200
See application file for complete search history.

(56) References Cited

U.S. PATENT DOCUMENTS

| | | | | |
|---|---|---|---|---|
| 5,874,965 A * | 2/1999 | Takai et al. | ........... | 345/667 |
| 6,380,953 B1 * | 4/2002 | Mizuno | ........... | 715/764 |
| 6,570,592 B1 * | 5/2003 | Sajdak et al. | ........... | 715/769 |
| 7,143,159 B1 * | 11/2006 | Grace et al. | ........... | 709/224 |
| 7,218,325 B1 * | 5/2007 | Buck | ........... | 345/440.2 |
| 2002/0059349 A1 * | 5/2002 | Wakita et al. | ........... | 707/517 |
| 2004/0125137 A1 * | 7/2004 | Stata et al. | ........... | 345/764 |
| 2005/0114500 A1 * | 5/2005 | Monk et al. | ........... | 709/224 |

* cited by examiner

*Primary Examiner*—Michelle K Lay
(74) *Attorney, Agent, or Firm*—Cooper & Dunham LLP

(57) ABSTRACT

A method for displaying time dependent information includes displaying a time axis, wherein periods of time are displayed equidistantly on the time axis regardless of an actual time period being represented and providing a user interface allowing a user to scroll along the time axis.

27 Claims, 4 Drawing Sheets

SYSTEMS AND METHODS FOR DISPLAYING TIME DEPENDENT INFORMATION

BACKGROUND

1. Technical Field

The present disclosure relates generally to a systems and methods for displaying information and, more particularly, to a systems and methods for displaying time dependent information.

2. Description of the Related Art

Information stored in a computer system is often valid for only a limited period of time. In many cases, the information is only valid until new information is entered into the system that supersedes the earlier information. This type of information is called "time dependent" information since it can vary over time. In many cases more than one type of time dependent information exists. For example, time dependent information on an employee may include the employees address information, their direct deposit bank account information, their salary information, job title, etc. any or all of which may change over time.

Very often, the amount of time information is valid changes. This can lead to difficulties when displaying information on a linear time axis. For example an employee's address might stay constant for ten years and then suddenly change monthly because the employee has become a consultant. When this information is displayed on a time axis, the display will show ten years with no change and the most recent years with many changes. The information in this format can be difficult to visualize and comprehend on a time axis. The information can also be shown in a table format, showing the day when the information became valid, the date it became invalid and the information itself. However, in contrast to the time axis display, the table format view does not provide a quick easy to see look at a glance overview of the information.

SUMMARY

This application describes tools (in the form of methodologies, apparatuses, and systems) for displaying time dependent information. The tools may be embodied in one or more computer programs stored on a computer readable medium or program storage device and/or transmitted in the form of a computer data signal in one or more segments via a computer network or other transmission medium.

A method for displaying time dependent information, comprises displaying a time axis, wherein periods of time are displayed equidistantly on the time axis regardless of an actual time period being represented and providing a user interface allowing a user to scroll along the time axis.

A programmed computer apparatus for displaying time dependent information, comprises a display for displaying a time axis, wherein periods of time are displayed equidistantly on the time axis regardless of an actual time period being represented and a user interface allowing a user to scroll along the time axis.

A computer recording medium including computer executable code for displaying time dependent information, comprises code for displaying a time axis, wherein periods of time are displayed equidistantly on the time axis regardless of an actual time period being represented and code for providing a user interface allowing a user to scroll along the time axis.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DETAILED DESCRIPTION

The following exemplary embodiments are set forth to aid in an understanding of the subject matter of this disclosure, but are not intended, and may not be construed, to limit in any way the claims which follow thereafter. Therefore, while specific terminology is employed for the sake of clarity in describing some exemplary embodiments, the present disclosure is not intended to be limited to the specific terminology so selected, and it is to be understood that each specific element includes all technical equivalents which operate in a similar manner.

Figure 8:
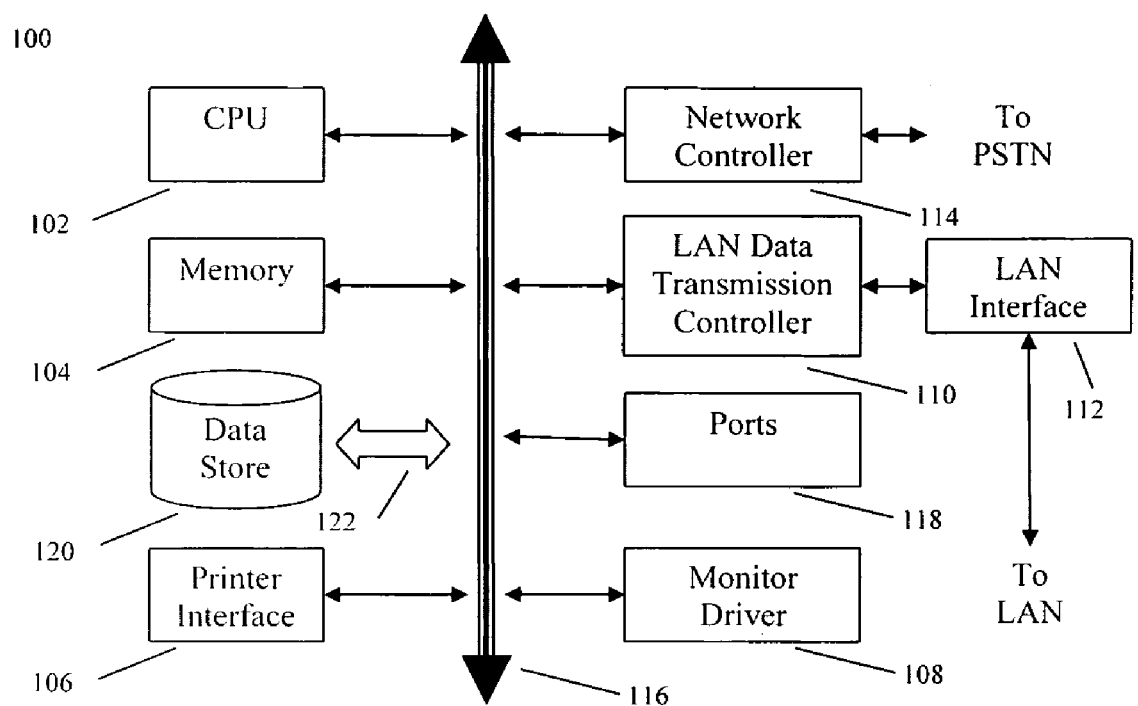
FIG. 8 shows a block diagram of an exemplary computer system capable of implementing the methods and systems of the present disclosure.

FIG. 8 shows an example of a computer system 100 which may implement the method and system of the present disclosure. The system and method of the present disclosure may be implemented in the form of a software application running on a computer system, for example, a mainframe, personal computer (PC), handheld computer, server, etc. The software application may be stored on a recording media locally accessible by the computer system, for example, floppy disk, compact disk, hard disk, etc., or may be remote from the computer system and accessible via a hard wired or wireless connection to a network, for example, a local area network, or the Internet.

The computer system 100 can include a central processing unit (CPU) 102, program and data storage devices 104, a printer interface 106, a display unit 108, a (LAN) local area network data transmission controller 110, a LAN interface 112, a network controller 114, an internal bus 116, and one or more input devices 118 (for example, a keyboard, mouse etc.). As shown the system 100 may be connected to a database 120, via a link 122.

The computer system 100 is merely exemplary. The specific embodiments described herein are illustrative, computer system(s) as referred to herein may include(s) individual computers, servers, computing resources, networks, etc., and many variations can be introduced on these embodiments without departing from the spirit of the disclosure or from the scope of the appended claims.

The embodiments of the present disclosure described herein provide an improved way of visualizing time dependent information. According to one aspect of the present disclosure, the time axis is condensed on an equidistant axis not showing long intervals of time when nothing has changed but reserving the same space for each change, regardless of the original length of the interval.

According to embodiments of the present disclosure, information can be displayed in a UI control to display lists of time dependent datasets both on a time axis and as a list for editing purposes, adding a context menu for data manipulation and a grouping (expand/collapse) functionality for data of different types.

Figure 1:
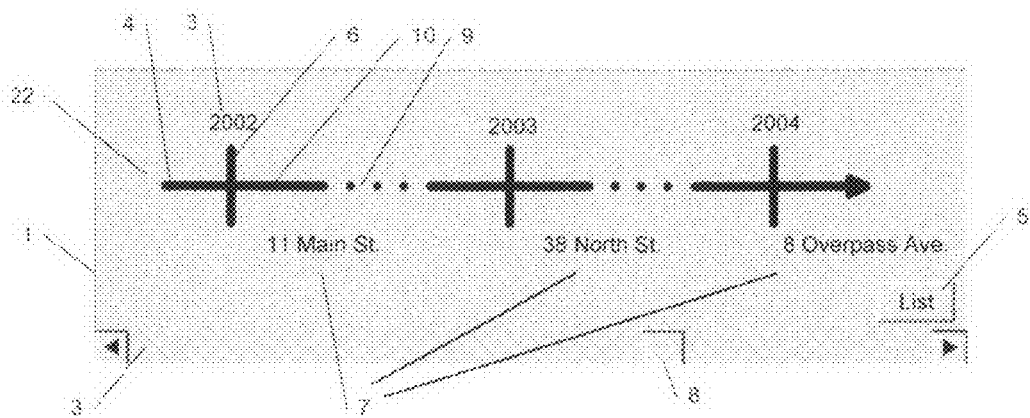
FIG. 1 depicts a time dependency control with a time axis according to an embodiment of the present disclosure.

FIG. 1 depicts a time dependency control with a time axis according to an embodiment of the present disclosure. According to this embodiment of the present disclosure, the time dependent information describes address information of an employee. The information is displayed in a resizable User Interface (UI) control 1 which includes a resizable time axis display area 22. A scrolling system 3 is provided on a portion of the UI control 1 allowing a user to scroll along the time axis 4. For example, according to this embodiment of the present disclosure, a scroll bar 8 is provided. Left clicking on bar 8 and dragging it left or right will scroll the displayed time axis 4 left or right accordingly. Of course, other types of scrolling systems are contemplated including, for example, slide controls or clicking on the time axis itself and dragging it left or right.

According to the embodiment of the present disclosure shown in FIG. 1, time axis 4 is non-linear, with all time intervals being shown equidistantly. The time axis 4 is compressed. That is, the beginning and ending of a year is shown as a year only 3. If one dataset is immediately subsequent to another dataset, (e,g, one begins immediately after the other), only the beginning of the second one is shown and the ending of the first one is omitted. Regardless of the length of a time interval, the interval is shown using delimiters 6, with a fixed length dotted line 9 in between solid lines 10. According to embodiments of the present disclosure, all or parts of the content information can be displayed below the time axis. For example, as shown in FIG. 1, a portion of the address information 7 (in this example, house number and street) is displayed below the time axis 4.

Figure 2:
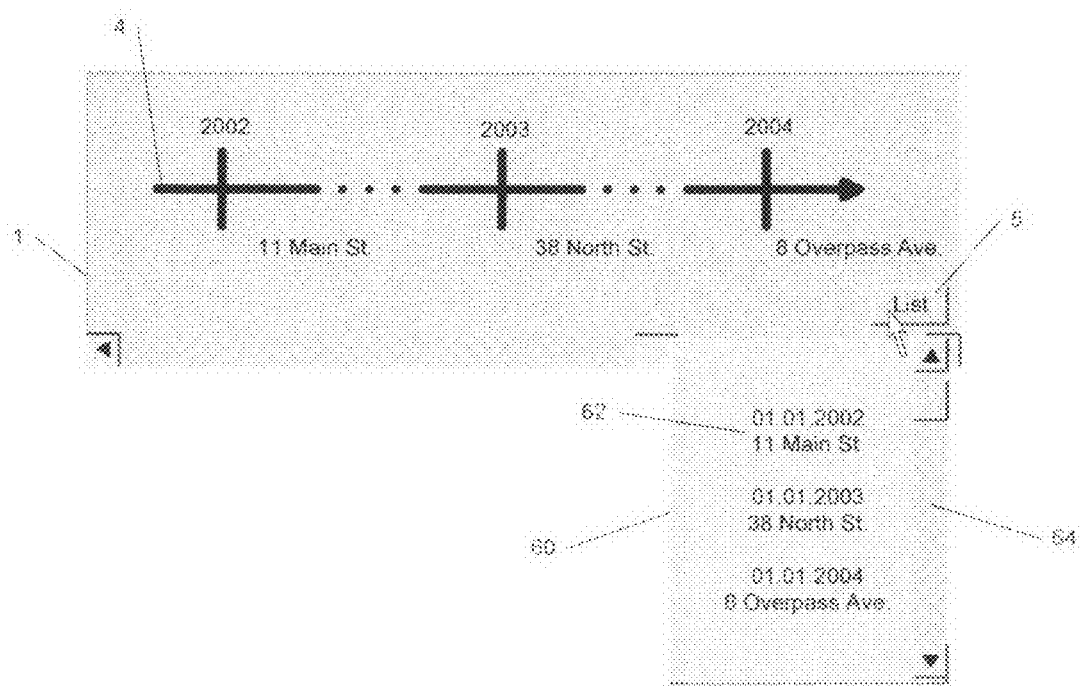
FIG. 2 depicts a time dependency control with a dropdown menu, according to an embodiment of the present disclosure.

Clicking on List button 5 will display a dropdown menu 60 as shown in FIG. 2. The dropdown menu 60 displays information entries 62 indicating each address and the validity start date corresponding to each address. If necessary, a scroll bar 64 is provided for scrolling through the entries. Clicking on an entry 62 will bring up an editing window allowing the user to edit data in the record.

Figure 3:
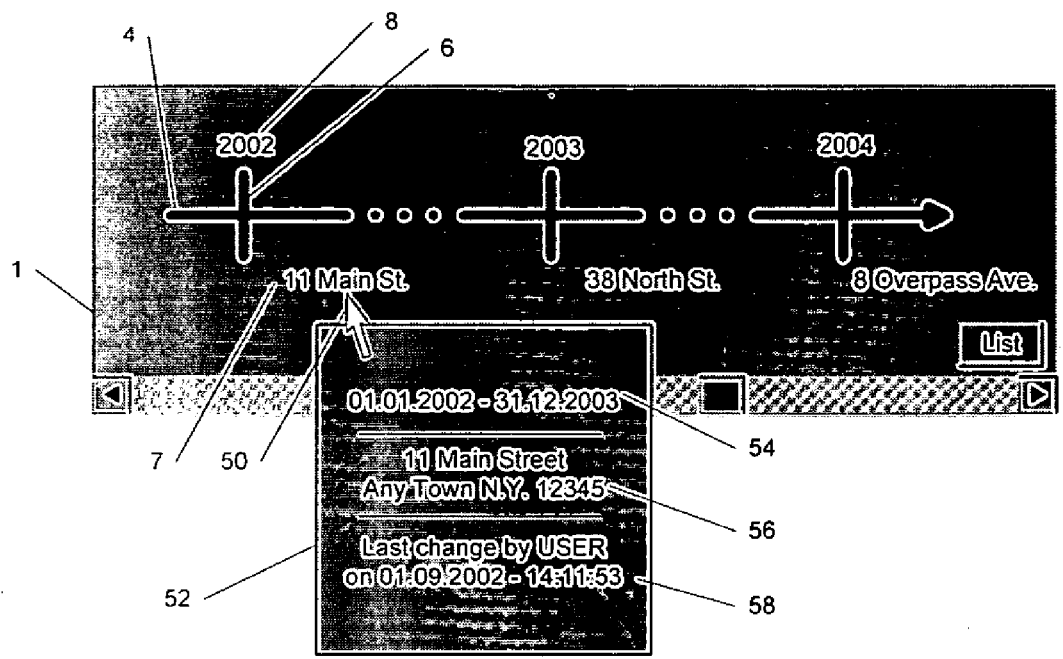
FIG. 3 depicts a time dependency control showing a quick info popup according to an embodiment of the present disclosure.
Figure 4:
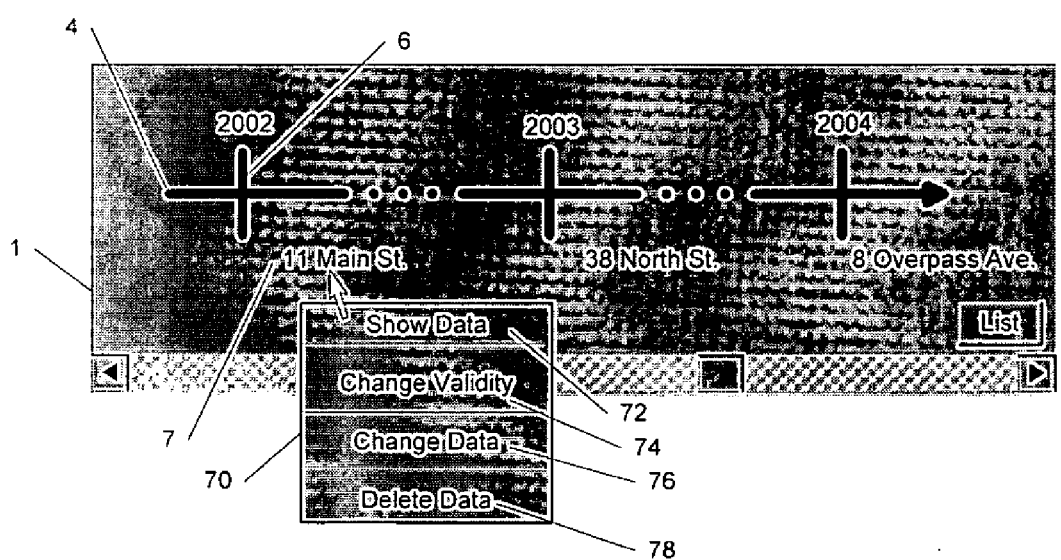
FIG. 4 depicts a time dependency control showing an action menu according to an embodiment of the present disclosure.

According to an embodiment of the present disclosure as shown in FIG. 3, moving the cursor 50 over the address information 7 or a corresponding delimiter 6 or a corresponding portion of the time axis 4 and keeping it there momentarily will cause a quick info popup 52 to be displayed. The popup shows the contents of the record 56, in this case the entire address as well as the validity time interval 54 indicating the period of time the address was valid. The popup also displays at least some administrative data 58 of the record. Accordingly, in this example, the record information displayed includes the actual dates (Jan. 1, 2002-Dec. 31, 2002) the employee lived at this address (11 Main Street, Any Town, N.Y. 12345). Administrative data 58 indicating the date and time the last change was made to this record is also displayed along with the name of the person that made the change (USER). According to another embodiment of the present disclosure, right clicking on an entry (e.g., an address) or corresponding delimiter 6 or a corresponding portion of the time axis 4 will cause an action menu 70 such as that shown in FIG. 4 to be displayed. Clicking on show data button 72 will display the data in a popup 52 similar to that shown in FIG. 3. Clicking change validity button 74 will display the validity data for the entry allowing the user to modify the validity information. Clicking change data button 76 will display the entry data (e.g., the address information) allowing the user to modify that data. Clicking delete data button 78 will prompt the user to confirm that they desire to delete the entry and then prompt the user to delete it if they so desire.

Figure 5:
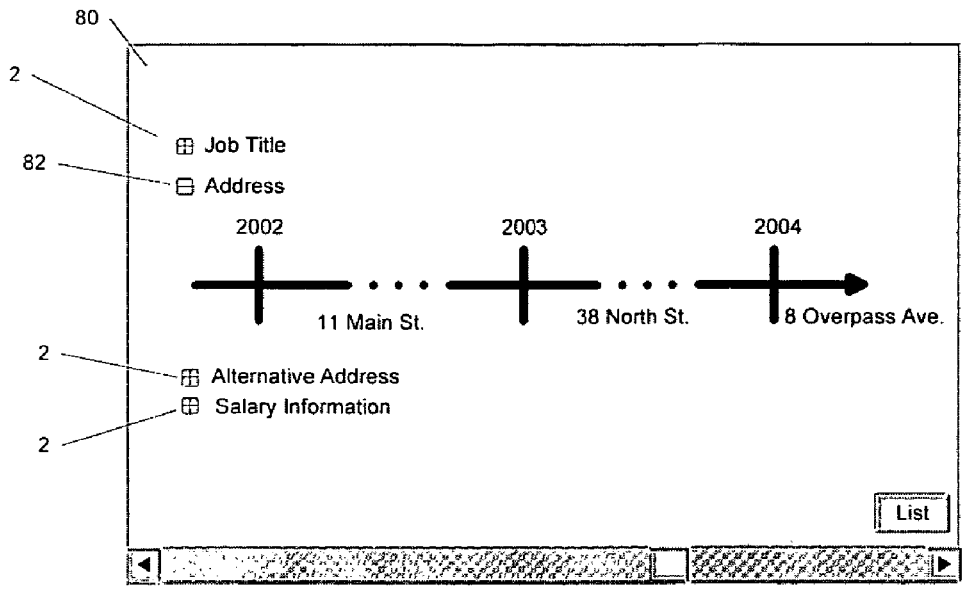
FIG. 5 shows dataset groupings according to an embodiment of the present disclosure.

Datasets belonging to the same time axis can be grouped as shown in FIG. 5. According to this embodiment, four dataset groupings (Job Title, Address, Alternative Address and Salary Information) are displayed in a tree selection format in the window 80 as shown. The address dataset 82 is currently being displayed in FIG. 5. However, clicking on the plus signs 2 will display those datasets also. According to this embodiment, multiple dataset groupings can be displayed at the same time by clicking the plus signs 2. According to another embodiment, only one dataset will be displayed at a time. For example, clicking on the Job Title dataset shown in FIG. 5 will display the job titles of this employee on a time axis and the address information will be minimized.

Figure 6:
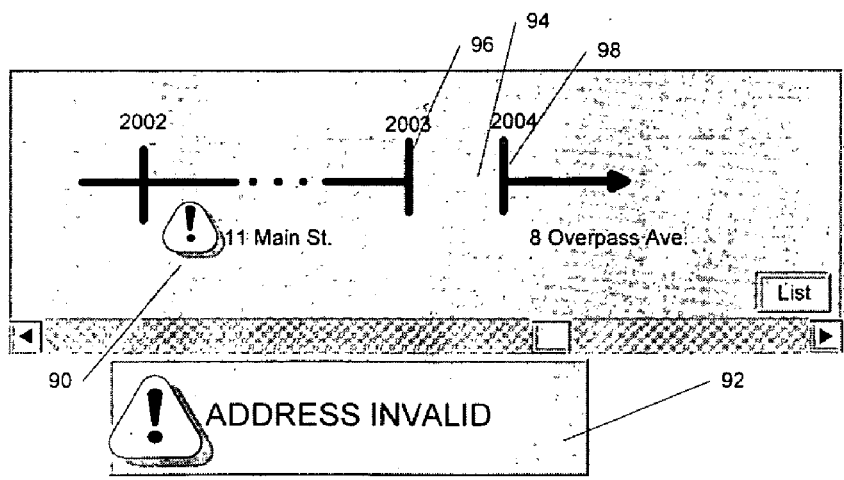
FIG. 6 shows a status icon according to an embodiment of the present disclosure.

According to an embodiment of the present disclosure, status icons can be provided with the data, indicating the status of the information. For example, as shown in FIG. 6, moving the cursor over icon 90 will display a message 92 indicating that the address is invalid. Various other types of icons can be used for providing status information. At times, there may be a gap between data sets. For example, there may be periods of time for which no information has been entered or for some other reason is not otherwise accessible. In this case, as also shown in FIG. 6, a blank space 94 is left between delimiters 96, 98 to indicate that no information is available. According to an embodiment of the present disclosure, the blank space 94 can be displayed compressed as shown. According to another embodiment of the present disclosure, clicking on the space 94 will display a message that information for the period beginning on a first date and ending on a second date is missing or unavailable.

Although described herein primarily using a yearly time axis, it will be appreciated that aspects of the present disclosure can also be applied to months, days, hours, minutes, etc. as appropriate, depending on the information in the record. In addition, it will be appreciated that aspects of the present disclosure can be applied to virtually any type of information capable of being displayed along a single axis.

Figure 7:
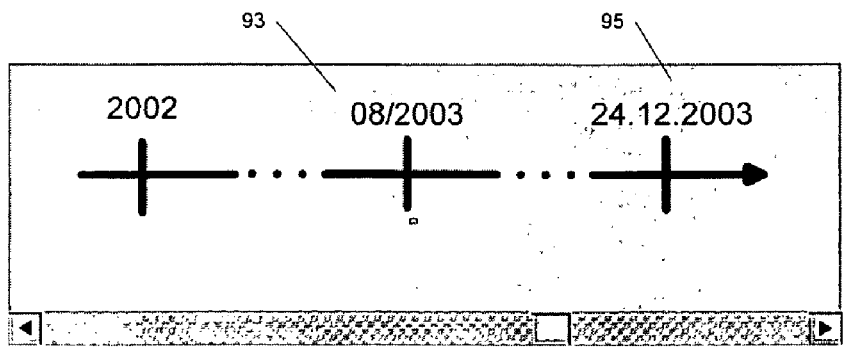
FIG. 7 shows a time axis with various ways of describing time periods according to embodiments of the present disclosure.

According to embodiments of the present disclosure, the beginning of a time period and an end of the time period are displayed on the time axis as a single reference to the time period, regardless of what that time period is. For example, in the above-described embodiments, the beginning and end of a year are shown as the year only. According to various other embodiments as shown in FIG. 7, the beginning/end of a month can be shown as a month 93 only. The beginning/end of a day can be shown as a day 95 only. Of course, the time axis can be displayed using combinations of year, month, day, etc. as desired, depending on the data being displayed.

The present system can be implemented in digital electronic circuitry, or in computer hardware, firmware, software, or in combinations of them. The system can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps associated with the present system can be performed by one or more programmable processors executing a computer program to perform functions of the invention by operating on input data and generating output. Method steps can also be performed by, and apparatus of the disclosure can be implemented as, special purpose logic circuitry. e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example, semiconductor memory devices, e.g., EPROM (Erasable Programmable Read-Only Memory), EEPROM (Electrically Erasable Programmable Read-Only Memory), and flash memory devices; magnetic disks, e.g., internal hard disks or removable disks; magneto-optical disks; CD-ROMs (Compact Disc Read-only Memory) and DVD-ROMs (Digital Versatile Disc Read-only Memory). The processor and the memory can be supplemented by, or incorporated in special purpose logic circuitry.

To provide for interaction with a user, the present disclosure can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The present system can be implemented in a computing system that includes a back-end component, e.g., as a data server, or that includes a middle-ware component, e.g., an application server, or that includes a front-end component, e.g., a client computer having a graphical interface or a Web browser through which a user can interact with an implementation of the present disclosure, or any combination of such back-end, middleware, or front-end components. The components of the computing system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on respective computers and having a client-server relationship to each other.

The present system has been described in terms of particular embodiments. Other embodiments are within the scope of the following claims. For example, although the present system has been described as a component in a larger system, it can also be implemented in other systems or as a stand-alone system.

Numerous additional modifications and variations of the present disclosure are possible in view of the above-teachings. It is therefore to be understood that within the scope of the appended claims, the present disclosure may be practiced other than as specifically described herein. For example, elements and/or features of different illustrative embodiments may be combined with each other and/or substituted for each other within the scope of this disclosure and appended claims.

What is claimed is:

1. A method for displaying time dependent information on a programmed computer apparatus, comprising:

displaying on a portion of a display in a tree selection format structure, information identifying a plurality of datasets belonging to a same time axis, wherein a user can select which of the plurality of datasets is to be displayed;

displaying on the display on at least one time axis each of the selected datasets, wherein periods of time are displayed equidistantly on the at least one time axis regardless of an actual time period being represented, and when a user selects a plurality of datasets to be displayed, each of the selected datasets are simultaneously displayed on a separate time axis and on the same portion of the display as the tree selection format structure; and providing a user interface allowing a user to scroll along the at least one time axis on the display, wherein a beginning of a time period and an end of the time period are displayed on the display on the at least one time axis as a single reference to the time period.

2. The method according to claim 1, wherein the period of time comprises at least one of a year, month and day.

3. The method according to claim 1, further comprising displaying business related status information along the time axis.

4. The method according to claim 1, further comprising displaying a record corresponding to a period of time adjacent to the time axis.

5. The method according to claim 4, wherein the record is displayed below the time axis.

6. The method according to claim 1, wherein the user interface comprises at least one of a scrollbar, slider and a pointer for grabbing and moving the axis itself.

7. The method according to claim 1, wherein each single reference to the time period comprises a delimiter.

8. The method according to claim 7, wherein each delimiter is labeled to identify the time period.

9. The method according to claim 8, wherein the label indicates at least one of a day, month and year, depending on the time dependent information being displayed.

10. A programmed computer apparatus for displaying time dependent information, comprising:

a display for displaying on a portion of the display in a tree selection format structure, information identifying a plurality of datasets belonging to a same time axis, wherein a user can select which of the plurality of datasets is to be displayed, the display displaying on at least one time axis each of the selected datasets, wherein periods of time are displayed equidistantly on the at least one time axis regardless of an actual time period being represented, and when a user selects a plurality of datasets to be displayed, each of the selected datasets are simultaneously displayed on a separate time axis and on the same portion of the display as the tree selection format structure; and a user interface allowing a user to scroll along the at least one time axis on the display, wherein a beginning of a time period and an end of the time period are displayed on the display on the at least one time axis as a single reference to the time period.

11. The programmed computer apparatus according to claim 10, wherein the period of time comprises at least one of a year, month and day.

12. The programmed computer apparatus according to claim 10, further comprising displaying business related status information along the time axis.

13. The programmed computer apparatus according to claim 10, further comprising displaying a record corresponding to a period of time adjacent to the time axis.

14. The programmed computer apparatus according to claim 13, wherein the record is displayed below the time axis.

15. The programmed computer apparatus according to claim 10, wherein the user interface comprises at least one of a scrollbar, slider and a pointer for grabbing and moving the axis itself.

16. The programmed computer apparatus according to claim 10, wherein each single reference to the time period comprises a delimiter.

17. The programmed computer apparatus according to claim 16, wherein each delimiter is labeled to identify the time period.

18. The programmed computer apparatus according to claim 17, wherein the label indicates at least one of a day, month and year, depending on the time dependent information being displayed.

19. A computer recording medium including computer executable code for displaying time dependent information, comprising:

code for displaying on a portion of a display in a tree selection format structure, information identifying a plurality of datasets belonging to a same time axis, wherein a user can select which of the plurality of datasets is to be displayed;

code for displaying on the display on at least one time axis each of the selected datasets, wherein periods of time are displayed equidistantly on the at least one time axis regardless of an actual time period being represented, and when a user selects a plurality of datasets to be displayed, each of the selected datasets are simultaneously displayed on a separate time axis and on the same portion of a display as the tree selection format structure; and code for providing a user interface allowing a user to scroll along the at least one time axis on the display, wherein a beginning of a time period and an end of the time period are displayed on the display on the at least one time axis as a single reference to the time period.

20. The computer recording medium according to claim 19, wherein the period of time comprises at least one of a year, month and day.

21. The computer recording medium according to claim 19, further comprising displaying business related status information along the time axis.

22. The computer recording medium according to claim 19, further comprising code for displaying a record corresponding to a period of time adjacent to the time axis.

23. The computer recording medium according to claim 22, wherein the record is displayed below the time axis.

24. The computer recording medium according to claim 19, wherein the user interface comprises at least one of a scrollbar, slider and a pointer for grabbing and moving the axis itself.

25. The computer recording medium according to claim 19, wherein each single reference to the time period comprises a delimiter.

26. The computer recording medium according to claim 25, wherein each delimiter is labeled to identify the time period.

27. The computer recording medium according to claim 26, wherein the label indicates at least one of a day, month and year, depending on the time dependent information being displayed.

* * * * *